US010795366B1

(12) United States Patent
Arbuckle et al.

(10) Patent No.: US 10,795,366 B1
(45) Date of Patent: Oct. 6, 2020

(54) VESSEL MANEUVERING METHODS AND SYSTEMS

(71) Applicant: Brunswick Corporation, Lake Forest, IL (US)

(72) Inventors: Jason S. Arbuckle, Horicon, WI (US); Thomas S. Kirchhoff, Fond du Lac, WI (US); Michael J. Lemancik, Oshkosh, WI (US); Walter B. Ross, Fond du Lac, WI (US); Robert M. Hackbarth, Neenah, WI (US); Mark W. Henker, Fond du Lac, WI (US); Steven L. Van Camp, Cascade, WI (US)

(73) Assignee: Brunswick Corporation, Mettawa, IL (US)

( * ) Notice: Subject to any disclaimer, the term of this patent is extended or adjusted under 35 U.S.C. 154(b) by 290 days.

(21) Appl. No.: 15/437,233

(22) Filed: Feb. 20, 2017

Related U.S. Application Data

(60) Provisional application No. 62/301,887, filed on Mar. 1, 2016.

(51) Int. Cl.
*G01D 5/02* (2006.01)
*B63H 25/04* (2006.01)
(Continued)

(52) U.S. Cl.
CPC ........... *G05D 1/0206* (2013.01); *B63H 21/21* (2013.01); *B63H 25/04* (2013.01); *G05D 1/0208* (2013.01);
(Continued)

(58) Field of Classification Search
CPC .... G05D 1/0206; G05D 1/0208; B63H 21/21; B63H 25/04; B63H 2021/216;
(Continued)

(56) References Cited

U.S. PATENT DOCUMENTS

| 2,360,361 A | 10/1944 | Mountbatten |
| 3,145,683 A | 8/1964 | Kolb et al. |

(Continued)

FOREIGN PATENT DOCUMENTS

| EP | 816962 A1 | 7/1998 |
| EP | 2161542 A1 | 3/2010 |

(Continued)

OTHER PUBLICATIONS

Ward et al., "Method and System for Close Proximity Collision Detection", U.S. Appl. No. 14/807,217, filed Jul. 23, 2015.

(Continued)

*Primary Examiner* — Nga X Nguyen
(74) *Attorney, Agent, or Firm* — Andrus Intellectual Property Law, LLP (57) ABSTRACT

A method includes accepting inputs to a marine vessel's control module, the inputs defining first and second waypoints and a desired heading, and defining a desired track between the first and second waypoints. Ideal steering and thrust commands required to orient the vessel at the desired heading and to maneuver the vessel from the first to the second waypoint are generated and carried out. The method includes measuring a current position and heading of the vessel; calculating a cross-track error based on the current position as compared to the desired track; and calculating a heading error based on the current heading as compared to the desired heading. The method includes generating corrective steering and thrust commands that are required to minimize the cross-track error and the heading error. The propulsion system propels the marine vessel according to the corrective steering and thrust commands, as appropriate.

19 Claims, 5 Drawing Sheets

(51) Int. Cl.
  *B63H 21/21*      (2006.01)
  *G01C 21/20*      (2006.01)
  *G05D 1/02*       (2020.01)

(52) U.S. Cl.
  CPC ....... *B63B 2213/02* (2013.01); *B63B 2721/00* (2013.01); *B63H 2021/216* (2013.01)

(58) Field of Classification Search
  CPC ........ B63H 25/42; B63H 20/12; B63H 25/06; B63B 2721/00; B63B 2213/02; B63B 2035/009; G01C 21/203; G01S 19/42
  See application file for complete search history.

(56) References Cited

U.S. PATENT DOCUMENTS

| | | | |
|---|---|---|---|
| 3,177,348 | A | 4/1965 | Daniloff |
| 3,187,704 | A | 6/1965 | Shatto, Jr. et al. |
| 3,688,252 | A | 8/1972 | Thompson |
| 3,715,571 | A | 2/1973 | Braddon |
| 3,771,483 | A | 11/1973 | Spencer |
| 4,253,149 | A | 2/1981 | Cunningham et al. |
| 4,257,718 | A | 3/1981 | Rosa et al. |
| 4,428,052 | A | 1/1984 | Robinson et al. |
| 4,513,378 | A | 4/1985 | Antkowiak |
| 4,769,773 | A | 9/1988 | Shatto, Jr. |
| 4,939,661 | A | 7/1990 | Barker et al. |
| 4,975,709 | A | 12/1990 | Koike |
| 5,172,324 | A | 12/1992 | Knight |
| 5,202,835 | A | 4/1993 | Knight |
| 5,331,558 | A | 7/1994 | Hossfield et al. |
| 5,362,263 | A | 11/1994 | Petty |
| 5,386,368 | A | 1/1995 | Knight |
| 5,390,125 | A | 2/1995 | Sennott et al. |
| 5,491,636 | A | 2/1996 | Robertson et al. |
| 5,736,962 | A | 4/1998 | Tendler |
| 5,884,213 | A | 3/1999 | Carlson |
| 6,059,226 | A | 5/2000 | Cotton et al. |
| 6,092,007 | A | 7/2000 | Cotton et al. |
| 6,230,642 | B1 | 5/2001 | McKenney et al. |
| 6,234,853 | B1 | 5/2001 | Lanyi et al. |
| 6,273,771 | B1 | 8/2001 | Buckley et al. |
| 6,308,651 | B2 | 10/2001 | McKenney et al. |
| 6,377,889 | B1 | 4/2002 | Soest |
| 6,446,003 | B1 | 9/2002 | Green et al. |
| 6,485,341 | B1 | 11/2002 | Lanyi et al. |
| 6,604,479 | B2 | 8/2003 | McKenney et al. |
| 6,611,737 | B1 | 8/2003 | El-Tahan et al. |
| 6,678,589 | B2 | 1/2004 | Robertson et al. |
| 6,848,382 | B1 | 2/2005 | Bekker |
| 6,995,527 | B2 | 2/2006 | DePasqua et al. |
| 7,140,315 | B2 | 11/2006 | Okuyama |
| 7,267,068 | B2 | 9/2007 | Bradley et al. |
| 7,268,703 | B1 | 9/2007 | Kabel et al. |
| 7,305,928 | B2 | 12/2007 | Bradley et al. |
| 7,366,593 | B2 | 4/2008 | Fujimoto et al. |
| 7,398,742 | B1 | 7/2008 | Gonring |
| 7,416,458 | B2 | 8/2008 | Suemori et al. |
| 7,467,595 | B1 | 12/2008 | Lanyi et al. |
| 7,476,134 | B1 | 1/2009 | Fell et al. |
| 7,538,511 | B2 | 5/2009 | Samek |
| 7,561,886 | B1 | 7/2009 | Gonring et al. |
| 7,577,526 | B2 | 8/2009 | Kim et al. |
| 7,630,798 | B2 | 12/2009 | Mossman et al. |
| 7,727,036 | B1 | 6/2010 | Poorman et al. |
| 8,050,630 | B1 | 11/2011 | Arbuckle |
| 8,082,100 | B2 | 12/2011 | Grace et al. |
| 8,145,370 | B2 | 3/2012 | Borrett |
| 8,145,371 | B2 | 3/2012 | Rae et al. |
| 8,150,621 | B1 | 4/2012 | Phillips et al. |
| 8,155,811 | B2 | 4/2012 | Noffsinger et al. |
| 8,215,252 | B1 | 7/2012 | Chun |
| 8,265,812 | B2 | 9/2012 | Pease |
| 8,326,472 | B2 | 12/2012 | Igarashi et al. |
| 8,417,399 | B2 | 4/2013 | Arbuckle et al. |
| 8,478,464 | B2 | 7/2013 | Arbuckle et al. |
| 8,480,445 | B2 | 7/2013 | Morvillo |
| 8,510,028 | B2 | 8/2013 | Grace et al. |
| 8,515,660 | B2 | 8/2013 | Grace et al. |
| 8,515,661 | B2 | 8/2013 | Grace et al. |
| 8,527,192 | B2 | 9/2013 | Grace et al. |
| 8,543,324 | B2 | 9/2013 | Grace et al. |
| 8,645,012 | B2 | 2/2014 | Salmon et al. |
| 8,694,248 | B1 | 4/2014 | Arbuckle et al. |
| 8,761,976 | B2 | 6/2014 | Salmon et al. |
| 8,777,681 | B1 | 7/2014 | McNalley et al. |
| 8,807,059 | B1 | 8/2014 | Samples et al. |
| 8,808,041 | B2 | 8/2014 | Hine et al. |
| 8,831,868 | B2 | 9/2014 | Grace et al. |
| 8,924,054 | B1 | 12/2014 | Arbuckle et al. |
| 9,039,468 | B1 | 5/2015 | Arbuckle et al. |
| 9,110,467 | B2 | 8/2015 | Yuet et al. |
| 9,132,900 | B2 | 9/2015 | Salmon et al. |
| 9,132,903 | B1 | 9/2015 | Gable et al. |
| 9,162,743 | B2 | 10/2015 | Grace et al. |
| 9,248,898 | B1 | 2/2016 | Kirchhoff et al. |
| 9,359,057 | B1 | 6/2016 | Andrasko et al. |
| 9,377,780 | B1 | 6/2016 | Arbuckle et al. |
| 9,676,464 | B2 | 6/2017 | Johnson et al. |
| 9,904,293 | B1 | 2/2018 | Heap et al. |
| 9,927,520 | B1 | 3/2018 | Ward et al. |
| 9,952,595 | B2 | 4/2018 | Arbuckle et al. |
| 10,095,232 | B1 | 10/2018 | Arbuckle et al. |
| 2003/0191562 | A1 | 10/2003 | Robertson et al. |
| 2004/0221787 | A1 | 11/2004 | McKenney et al. |
| 2005/0092225 | A1 | 5/2005 | Kaji et al. |
| 2005/0164569 | A1 | 7/2005 | Kaji et al. |
| 2005/0170713 | A1 | 8/2005 | Okuyama |
| 2006/0089794 | A1 | 4/2006 | DePasqua |
| 2006/0116796 | A1 | 6/2006 | Fossen et al. |
| 2007/0017426 | A1 | 1/2007 | Kaji et al. |
| 2007/0089660 | A1 | 4/2007 | Bradley et al. |
| 2007/0162207 | A1 | 7/2007 | Shimo et al. |
| 2007/0178779 | A1 | 8/2007 | Takada et al. |
| 2007/0203623 | A1 | 8/2007 | Saunders et al. |
| 2007/0089654 | A1 | 9/2007 | Bradley et al. |
| 2007/0233389 | A1 | 10/2007 | Stephens |
| 2008/0027597 | A1 | 1/2008 | Barrett et al. |
| 2009/0037040 | A1 | 2/2009 | Salmon et al. |
| 2009/0076671 | A1 | 3/2009 | Mizutani |
| 2009/0171520 | A1 | 7/2009 | Kaji |
| 2009/0276148 | A1 | 11/2009 | Ardvisson |
| 2010/0023192 | A1 | 1/2010 | Rae et al. |
| 2010/0070124 | A1 | 3/2010 | Yeager et al. |
| 2010/0109944 | A1 | 5/2010 | Whitehead et al. |
| 2011/0153126 | A1 | 6/2011 | Arbuckle et al. |
| 2011/0288714 | A1 | 11/2011 | Flohr et al. |
| 2012/0129410 | A1 | 5/2012 | Tyers |
| 2012/0130570 | A1* | 5/2012 | Pease ..................... B63H 25/04 701/21 |
| 2012/0248259 | A1 | 10/2012 | Page et al. |
| 2013/0080044 | A1 | 3/2013 | Tyers et al. |
| 2013/0297104 | A1 | 11/2013 | Tyers et al. |
| 2014/0114509 | A1 | 4/2014 | Venables et al. |
| 2014/0362661 | A1 | 12/2014 | Muijzert et al. |
| 2015/0089427 | A1 | 3/2015 | Akuzawa |
| 2015/0277442 | A1 | 10/2015 | Ballou |
| 2015/0321740 | A1 | 11/2015 | Bradley et al. |
| 2015/0346730 | A1 | 12/2015 | Stephens et al. |
| 2016/0016651 | A1 | 1/2016 | Anderson et al. |
| 2016/0039500 | A1 | 2/2016 | Heyring et al. |
| 2016/0061980 | A1* | 3/2016 | Tonchia ............... G01V 1/3808 701/21 |
| 2016/0101838 | A1 | 4/2016 | Kojima |
| 2016/0125739 | A1 | 5/2016 | Stewart et al. |
| 2016/0246300 | A1 | 8/2016 | Langford-Wood |
| 2016/0252907 | A1 | 9/2016 | Parkinson |
| 2016/0299507 | A1 | 10/2016 | Shah et al. |
| 2016/0334792 | A1 | 11/2016 | Jopling |
| 2017/0205828 | A1 | 7/2017 | Estabrook |
| 2017/0205829 | A1 | 7/2017 | Tyers |
| 2017/0210449 | A1 | 7/2017 | Frisbie et al. |
| 2017/0255200 | A1 | 9/2017 | Arbuckle et al. |
| 2017/0255201 | A1* | 9/2017 | Arbuckle ................. B63J 99/00 |

(56) References Cited

U.S. PATENT DOCUMENTS

| | | |
|---|---|---|
| 2017/0277189 A1 | 9/2017 | Johnson et al. |
| 2017/0349257 A1 | 12/2017 | Hara |
| 2017/0365175 A1 | 12/2017 | Harnett |
| 2018/0015994 A1 | 1/2018 | Kishimoto et al. |
| 2018/0106619 A1 | 4/2018 | Johnson et al. |
| 2018/0231980 A1 | 8/2018 | Arbuckle et al. |
| 2018/0284815 A1 | 10/2018 | Cui et al. |
| 2019/0286169 A1 | 9/2019 | Cui et al. |
| 2019/0359300 A1 | 11/2019 | Johnson et al. |

FOREIGN PATENT DOCUMENTS

| | | |
|---|---|---|
| EP | 2952994 | 12/2015 |
| GB | 1173442 | 12/1969 |
| JP | 58061097 | 4/1983 |
| JP | 05-203638 A | 8/1993 |
| JP | 7223591 | 8/1995 |
| JP | 2926533 B2 | 7/1997 |
| JP | 11-129978 A | 5/1999 |
| JP | 2001-287697 | 10/2001 |
| JP | 2002-178990 | 6/2002 |
| JP | 2002173091 A | 6/2002 |
| JP | 2003276677 | 10/2003 |
| JP | 2003276677 A | 10/2003 |
| JP | 200442884 A | 2/2004 |
| JP | 2004355105 A | 12/2004 |
| JP | 2005-200004 | 7/2005 |
| JP | 2006-137309 | 6/2006 |
| JP | 2006137309 A | 6/2006 |
| JP | 2009-227035 | 10/2009 |
| JP | 2009-241738 | 10/2009 |
| JP | 2009-538782 A | 11/2009 |
| JP | 2011128943 | 6/2011 |
| JP | 5042906 B2 | 7/2012 |
| JP | 2012528417 A | 11/2012 |
| JP | 5226355 B2 | 7/2013 |
| JP | 2014065495 | 4/2014 |
| JP | 200546034 A | 2/2015 |
| WO | 9205505 A1 | 4/1992 |
| WO | WO 2006058400 | 6/2006 |
| WO | WO 2014033457 | 3/2014 |
| WO | WO 2016104031 | 6/2016 |
| WO | WO 2017095235 A1 | 6/2017 |
| WO | WO-2017095235 A1 * | 6/2017 ............ B63B 9/00 |

OTHER PUBLICATIONS

Poorman et al., "Multilayer Control System and Method for Controlling Movement of a Marine Vessel", U.S. Appl. No. 11/965,583, filed Dec. 27, 2007.

Andrasko et al., "System and Method for Controlling Handling of a Marine Vessel", U.S. Appl. No. 14/484,702, filed Sep. 12, 2014.

Arbuckle et al., "Station Keeping Methods," Unpublished U.S. Appl. No. 15/445,031, filed Feb. 28, 2017.

Arbuckle et al., "Station Keeping Methods," Unpublished U.S. Appl. No. 15/887,372, filed Feb. 2, 2018.

Gonring, "System and Method for Controlling Course of a Marine Vessel," Unpublished U.S. Appl. No. 15/415,095, filed Jan. 25, 2017.

Arbuckle et al., "Methods for Positioning Marine Vessels," Unpublished U.S. Appl. No. 16/028,019, filed Jul. 5, 2018.

* cited by examiner

VESSEL MANEUVERING METHODS AND SYSTEMS

CROSS-REFERENCE TO RELATED APPLICATION

The present application claims the benefit of U.S. Provisional Application Ser. No. 62/301,887, filed on Mar. 1, 2016, which is hereby incorporated by reference.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various autopilot, station keeping, and waypoint tracking features and related system and method improvements include: U.S. Pat. Nos. 7,267,068; 7,561,886; 8,050,630; 8,417,399; 8,694,248; 8,777,681; 8,807,059; 8,924,054; 9,039,468; 9,132,903; 9,248,898; 9,377,780; and unpublished U.S. patent application Ser. No. 14/484,702, filed Sep. 12, 2014, and Ser. No. 14/807,217, filed Jul. 23, 2015. Each of these patents and applications is hereby incorporated by reference herein.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

One example of the present disclosure is of a method for maneuvering a marine vessel powered by a propulsion system. The method includes accepting inputs to a control module, the inputs defining a first waypoint, a second waypoint, and a desired heading; and defining a desired track between the first and second waypoints. The method includes generating ideal steering and thrust commands that are required to orient the vessel at the desired heading and to maneuver the vessel along the desired track, wherein the propulsion system thereafter propels the vessel according to the ideal steering and thrust commands. The method also includes measuring a current position and a current heading of the vessel; calculating a cross-track error based on the vessel's current position as compared to the desired track; and calculating a heading error based on the vessel's current heading as compared to the desired heading. The method then includes generating corrective steering and thrust commands that are required to minimize the cross-track error and the heading error. The propulsion system propels the marine vessel according to the corrective steering and thrust commands, as appropriate, so as to maintain the vessel on the desired track at the desired heading.

Another example of the present disclosure is of a navigational system for a marine vessel. The navigational system comprises an electronic navigation device that defines a desired track including first and second waypoints and a desired heading, wherein the desired heading is not equal to an absolute bearing between the first and second waypoints. A control module is in signal communication with the electronic navigation device and determines ideal steering and thrust commands that are required to orient the vessel at the desired heading and to maneuver the vessel along the desired track. A vessel propulsion system propels the vessel according to the ideal steering and thrust commands from the control module. A position determination device provides a current position of the vessel to the electronic navigation device, which calculates a cross-track error based on the vessel's current position as compared to the desired track. A heading detector provides a current heading of the vessel to the control module. The control module receives the cross-track error from the electronic navigation device, calculates a heading error based on the vessel's current heading as compared to the desired heading, and generates corrective steering and thrust commands that are required to minimize the cross-track error and the heading error. The propulsion system propels the vessel according to the corrective steering and thrust commands, as appropriate, so as to maintain the vessel on the desired track at the desired heading.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
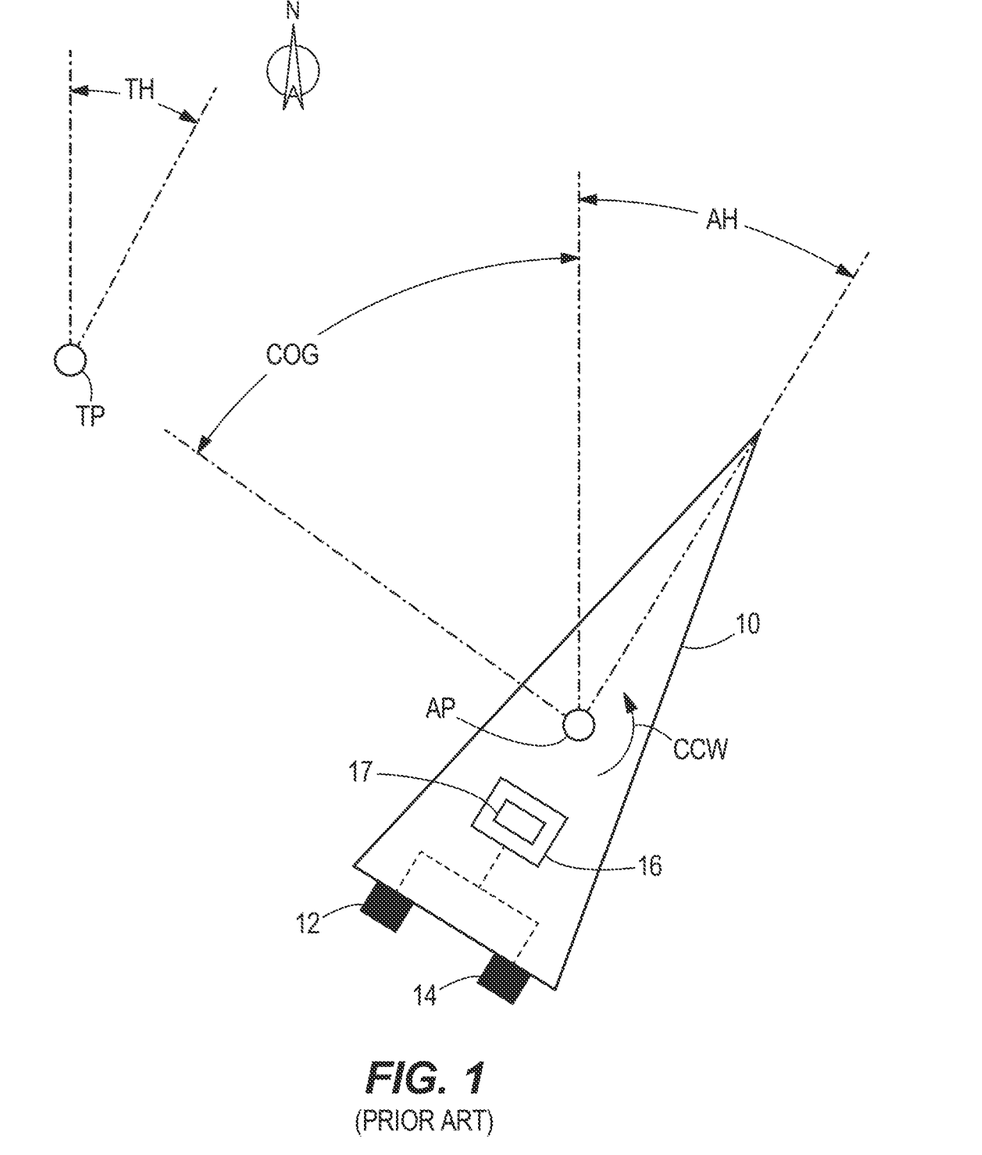
FIG. 1 is a schematic for purposes of illustrating a station keeping method.

Referring to FIG. 1, in a station keeping mode, a marine vessel 10 can be maintained in a single global position (defined by latitude and longitude) and at a predetermined heading by way of an algorithm that controls the vessel's propulsion devices 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. A control module 16 that controls thrust and angular orientation of the propulsion devices 12, 14 acts as a joystick and calculates left/right, fore/aft, and yaw commands required to drive the vessel's position error and heading error to zero. The control module 16 can control one or more propulsion devices 12, 14 to do so, which may be outboards, stern drives, pod drives, and/or thrusters. Note that the following systems and methods can be implemented on multi-engine vessels (see FIG. 1) or on single-engine vessels (see FIG. 2).

An example of the inputs to the control module's calculations is shown in FIG. 1. In this example, the actual global position (AP) of a preselected point on the vessel 10, as determined by a GPS receiver, is not equal to a setpoint target global position (TP), and thus the control module 16 will calculate a course over ground (COG) that the vessel 10 must travel to reach the target global position TP. Additionally, a setpoint target heading (TH) is 27 degrees from north, while the actual heading (AH) read from a compass or an inertial measurement unit (IMU) is 35.8 degrees. The control module 16 will therefore determine that a counterclockwise yaw movement (arrow CCW) of 8.8 degrees is required to return the vessel 10 to the target heading TH.

The control module 16 determines when and how much corrective action to take according to a three-dimensional (left/right, fore/aft, and yaw) proportional, integral, and derivative (PID) control algorithm performed by a feedback controller 17 of the control module 16. The integral term allows the control system to reject constant and slowly varying disturbances (e.g., current) while maintaining near zero position error. The proportional and derivative terms handle the quickly varying disturbances. The integral term is also considered to have memory and can take time to increase or decrease, especially if the disturbance forces grow. The PID feedback controller 17 computes a desired force in the forward/back and left/right directions with reference to the marine vessel 10, along with a desired yaw moment relative to the marine vessel 10, in order to null the error elements. The computed force and moment elements are then transmitted to the vessel propulsion system, which delivers the requested forces and moments by positioning the independently steerable propulsion devices 12, 14, controlling the power provided to the propellers of each device, and controlling the thrust vector directions of both devices. Such automatic correction of the position and heading of the marine vessel 10 can be achieved according to the principles described in U.S. Pat. No. 7,305,928, which was incorporated by reference herein above.

Besides station keeping, a marine vessel can be controlled in a waypoint tracking mode, as disclosed in U.S. Pat. No. 9,377,780, which was incorporated by reference above. In the waypoint tracking mode, the marine vessel 10 is automatically guided to a waypoint (e.g., a global position defined in terms of latitude and longitude) or to several waypoints along a track. To initiate waypoint tracking mode, for example, the operator of the marine vessel 10 may select a point or a track from a chart plotter and select waypoint tracking mode from the chart plotter or from a separate autopilot. The control module 16 then obtains a commanded course from the autopilot according to the information provided by the chart plotter. The control module 16 then automatically guides the marine vessel 10 to each waypoint along the desired track (or to the single selected waypoint) by providing steering and thrust commands to the propulsion devices 12, 14. For example, referring to FIG. 3, the points 301, 302, and 303 are waypoints in a desired track 300 defined by the solid line arrows. The course from waypoint 301 to waypoint 302 is along the solid line arrow connecting the two points. If the marine vessel 10 veers off this course, such as due to the effect of wind, waves, or the like, the control module 16 determines the corrective action needed to resume the commanded course so as to guide the marine vessel 10 back on track. The control module 16 provides steering and/or thrust commands to the propulsion devices 12, 14 to achieve such corrective action.

Figure 3:
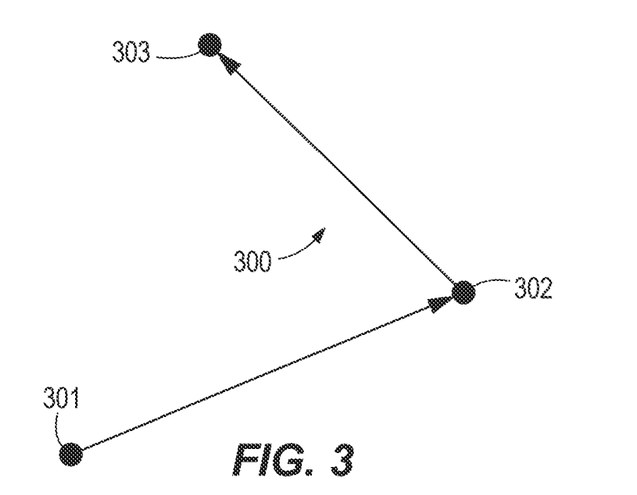
FIG. 3 illustrates one example of a track the marine vessel is programmed to navigate.

In the waypoint tracking mode, the control module 16 may use a course feedback signal (indicating an estimate of the course along which the marine vessel 10 is actually being propelled) to determine whether correction needs to be made to the actual course of the marine vessel 10 in order to maintain the commanded course along the desired track. The feedback controller 17 of the control module 16 uses the course feedback signal to determine how and to what extent the propulsion devices 12, 14 must be steered (and/or provided with what thrust) in order to re-orient the marine vessel 10 to the commanded course. Such measurement and automatic correction of the course of the marine vessel 10 can be achieved according to the principles described in U.S. Pat. Nos. 9,039,468 and 9,377,780, the disclosures of which are hereby incorporated by reference in their entireties.

Figure 2:
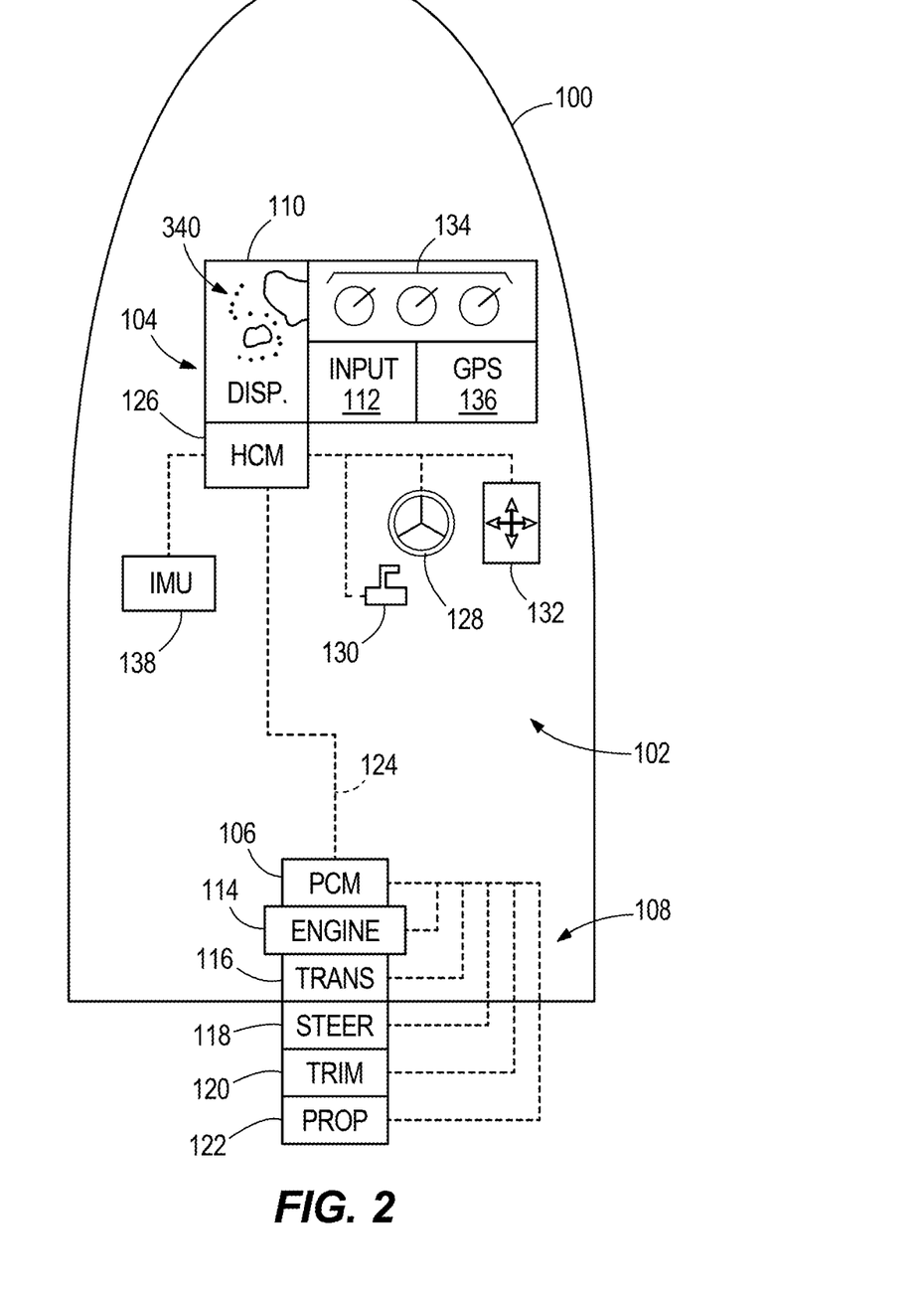
FIG. 2 illustrates a marine vessel with a navigational system and a propulsion system.

FIG. 2 illustrates another example of a marine vessel 100 and its navigational system 102, including an electronic navigation device 104 and a propulsion control module (PCM) 106 in signal communication with the electronic navigation device 104. The electronic navigation device 104 comprises a display screen 110 and user input device 112. The user input device 112 could be one or more of a touch sensitive display screen (which can be the same as the display screen 110), a keyboard, a mouse, a track ball, a button or buttons, a stylus, a smart device such as a smart phone or a tablet, a remote control, a voice recognition module, etc. The electronic navigation device 104 can, for instance, be a chart plotter or a combined fish finder and chart plotter. Other electronic navigational devices provided with GPS capabilities or other location determination capabilities may be used.

The PCM 106 controls a vessel propulsion system 108, including an engine 114, transmission 116, steering actuator 118, trim actuator 120, and propeller 122. The vessel propulsion system 108 may alternatively comprise two or more propulsion devices, as shown at 12, 14 in FIG. 1, which may each have the components listed herein above, although such components are not shown. Returning to FIG. 2, the PCM 106 is in signal communication via a communication link 124 with the electronic navigation device 104, such as through a helm control module (HCM) 126. The HCM 126 is also in signal communication with a steering wheel 128, a throttle/shift lever 130, a joystick 132, and a number of gauges 134, located at or near a helm of the vessel 100. A position determination device, such as a global positioning system (GPS) receiver 136, is also provided as part of or in signal communication with the electronic navigation device 104. Note that other types of position determination devices, such as a radio-based system or a DGPS system, could instead be provided. The vessel 100 also has a heading detector, such as an inertial measurement unit (IMU) 138, in signal communication with the HCM 126. In other examples, a compass, gyro, or an attitude and heading reference system may be used for detecting the vessel's heading. A speed of the vessel 100 could be determined from a vessel speed sensor such as a pitot tube or a paddle wheel, or by using GPS position readings over time.

The control modules (such as PCM 106 and HCM 126) are programmable and include a processing system and a storage system. The control modules can be located anywhere on the vessel 100 and/or located remote from the vessel 100 and can communicate with various components of the vessel 100 via peripheral interfaces and wired and/or wireless links, as will be explained further herein below. Although FIG. 2 shows two control modules 106, 126, the vessel 100 can include one combined control module, such as that shown at 16 in FIG. 1. Portions of the method disclosed herein below can be carried out by a single control module or by several separate control modules. For example, the system can have a control module 126 located at or near a helm of the vessel 100 and can also have control module(s) 106 located at or near each propulsion device. Either of the PCM 106 or the HCM 126 can be the control module that carries out the maneuvering method described in the present disclosure, or portions of the maneuvering method can be carried out separately on the PCM 106 or the HCM 126, which together can be the control module. The electronic navigation device 104 can be programmed to perform some of the calculations described herein below, or the control module(s) 106, 126 can be programmed to perform certain calculations. The electronic navigation device 104 can provide commands to the control module(s) 106, 126 on its own initiative, or in response to a command from the control module(s) 106, 126.

In some examples, the control modules 106, 126 may include a computing system that includes a processing system, storage system, software, and input/output (I/O) interface for communicating with peripheral devices. The systems may be implemented in hardware and/or software that carries out a programmed set of instructions. For example, the processing system loads and executes software from the storage system, such as software programmed with a vessel maneuvering method, which directs the processing system to operate as described herein below in further detail.

The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 106, 126 communicates with one or more components on the vessel 100 via its respective I/O interface and the communication link 124, which can be a wired or wireless link. In one example, the communication link 124 is a controller area network (CAN) bus, but other types of links could be used. Note that the connections shown herein by dotted lines are not the only connections that may exist between the various components on the vessel 100, but rather are used for purposes of illustration.

The provided description of the control modules 16, 106, 126 is conceptual and should be interpreted generally, as those skilled in the art will recognize many ways to implement such a control module. These include implementation using a digital microprocessor that receives input signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

Below, the maneuvering methods of the present disclosure will be described as being carried out by the HCM 126 so as to explain the system shown in FIG. 2, although it should be understood that the references thereto apply equally to the PCM 106 or to a single vessel control module 16, either of which can carry out a portion or a whole of the maneuvering methods described herein.

Currently, as described herein above, station keeping allows a vessel 10 to be electronically anchored at a single target position TP and a particular target heading TH. Waypoint tracking allows a vessel 10 to be automatically guided along a desired track 300 by traveling from one latitude/longitude coordinate to another. The following examples expand upon and combine these concepts in innovative ways to provide maneuvers that were heretofore not available for larger vessels propelled by propulsion devices that use internal combustion engines for power. For example, through research and development the present inventors have discovered that it is desirable to be able to control a vessel at a heading that is independent of the vessel's movement between waypoints. This not only prevents an operator's fishing lines from getting tangled as the vessel traverses between waypoints, it also allows the operator to potentially fish a wider swath of water than previously. Various other features and benefits will be made apparent in the description below.

According to the present disclosure, the vessel 100 is controlled to follow a route (e.g., desired track 300) between two or more waypoints (e.g., 301, 302, 303), which can be user-defined, while maintaining a user-defined heading. The vessel's heading is controlled such that it is not the same as the absolute bearing between two consecutive waypoints. In fact, the vessel's heading may be independent of the absolute bearing between any two waypoints (i.e., the bow of the vessel 100 need not be directed toward the next waypoint) and can be changed along the course between the two waypoints. Additionally, the vessel's heading is independent of the absolute bearing between two consecutive waypoints in that the heading is also oriented in a way that does more than correct for cross-track error due to wind, waves, current, etc. In other words, the vessel's heading is not different from the bearing between two waypoints in that it merely corrects for external forces acting on the vessel 100, as does a crab angle for an aircraft. Instead, the heading is controlled to a user-defined heading value that is independent of course, and is maintained at that specific user-defined value despite the presence of external forces acting on the vessel 100. The vessel 100 can move continually between the two or more waypoints (if two waypoints, back and forth; if three waypoints back and forth or in a triangle; etc.) to allow the operator to, for example, fish a given area. The operator could choose to remain (i.e., electronically anchor) at one or all of the waypoints for a predetermined period of time before continuing to the next waypoint.

Figure 4:
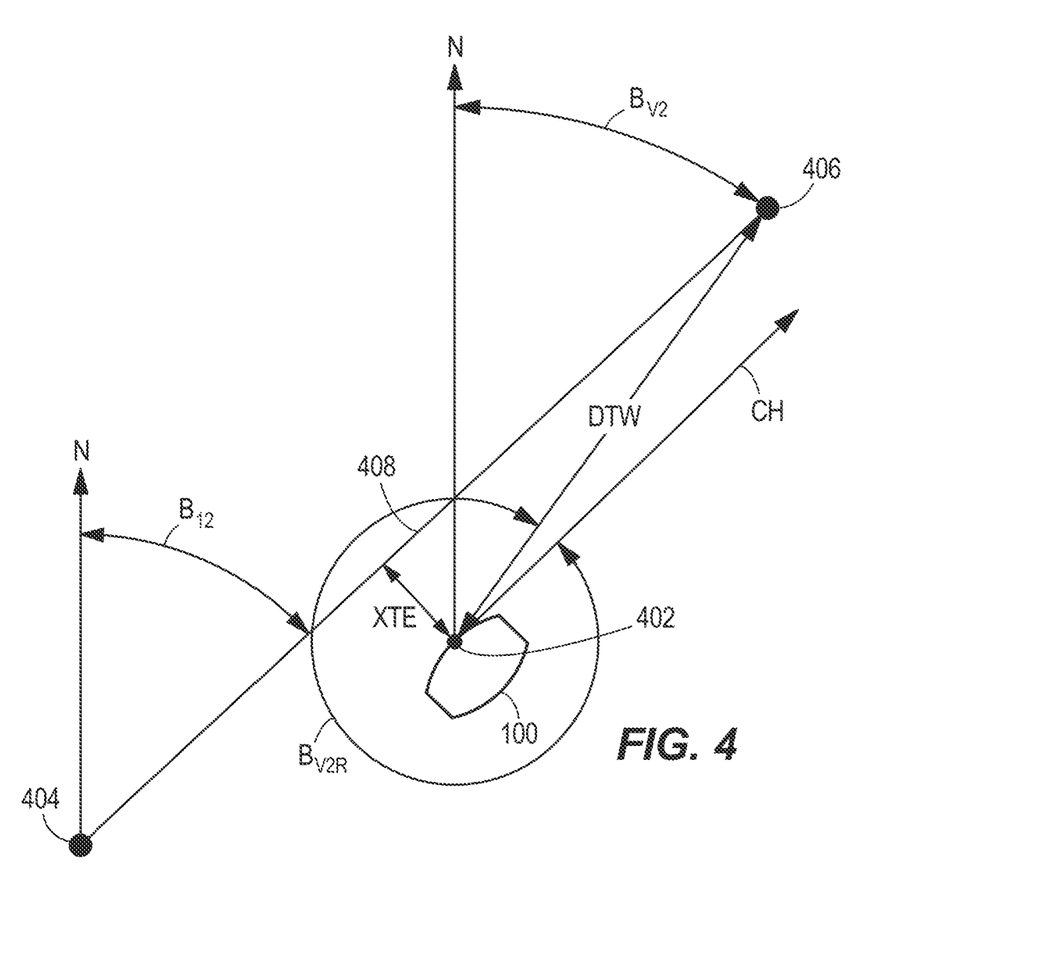
FIG. 4 is a schematic used to illustrate absolute bearing between two waypoints, a marine vessel's cross-track error, absolute and relative bearings to a waypoint, and distance to a waypoint.

Typical electronic navigation devices provide a destination waypoint latitude, destination waypoint longitude, and cross-track error. These three parameters specify where the vessel is going (latitude/longitude) and how the vessel gets there (track). For example, as shown in FIG. 4, the latitude/longitude parameters from the GPS receiver 136 and the electronic navigation device 104 are used to calculate an absolute bearing $B_{V2}$ from the vessel's current position at 402 to a desired waypoint 406, where $B_{V2}$ is the angle between due north N and the line connecting point 402 to point 406. Note that the line connecting point 402 to point 406 can also be used to define a relative bearing $B_{V2R}$ between the vessel's current position and the desired waypoint, with respect to the vessel's current heading (represented by arrow CH). This line also defines a distance DTW from the vessel's current position at 402 to the desired waypoint 406. In an example in which when the vessel 100 is programmed to have a heading that is in the direction of the destination waypoint 406, the cross-track error XTE is used to calculate an absolute bearing $B_{12}$ between waypoints 404 and 406, which then becomes the target heading. For example:

$$TH = B_{12} = B_{V2} + \sin^{-1}\frac{XTE}{DTW}$$

Where TH is the target heading defined with respect to due north N, and $B_{12}$, $B_{V2}$, XTE, and DTW are defined as above. The control module biases the target heading TH using the cross-track error XTE to cause the vessel 100 to head towards the desired track 408 defined by the straight line between the two waypoints 404, 406.

According to the present method, the control module 126 will calculate the thrust command (angle and magnitude) required to move the vessel 100 to the desired waypoint 406, similar to how the control module 16 currently calculates what thrust is required to return the vessel 10 to an anchor point when in station keeping mode, as described with respect to FIG. 1. The control module 126 will then use the cross-track error XTE from the electronic navigation device 104 to cause the vessel 100 to head back toward the desired track 408, similar to what was described above with respect to FIG. 4. However, the control module 126 will not use the absolute bearing $B_{12}$ between waypoints 404 and 406 as the target heading. Rather, the control module 126 will maintain the target heading at the user-defined value while maneuvering the vessel 100 back onto the desired track 408.

Referring to FIGS. 2 and 5-7, a method for maneuvering a marine vessel 100 powered by a propulsion system 108 will be described. As shown at 702, the method includes accepting inputs to a control module 126, the inputs defining a first waypoint 504, a second waypoint 506, and a desired heading 510 (angle between arrows representing due north N and desired heading DH). According to the present method, the desired heading 510 is not equal to an absolute bearing $B_{12}$ between the first and second waypoints 504, 506. In fact, the desired heading 510 is independent of the absolute bearing $B_{12}$ between the first and second waypoints 504, 506 and independent of external conditions, such as wind, waves, and current, acting on the vessel 100. The desired heading 510 is selected by the operator, and can be input to the electronic navigation device 104 by way of the input device 112, as will be described further herein below.

Figures 5, 6:
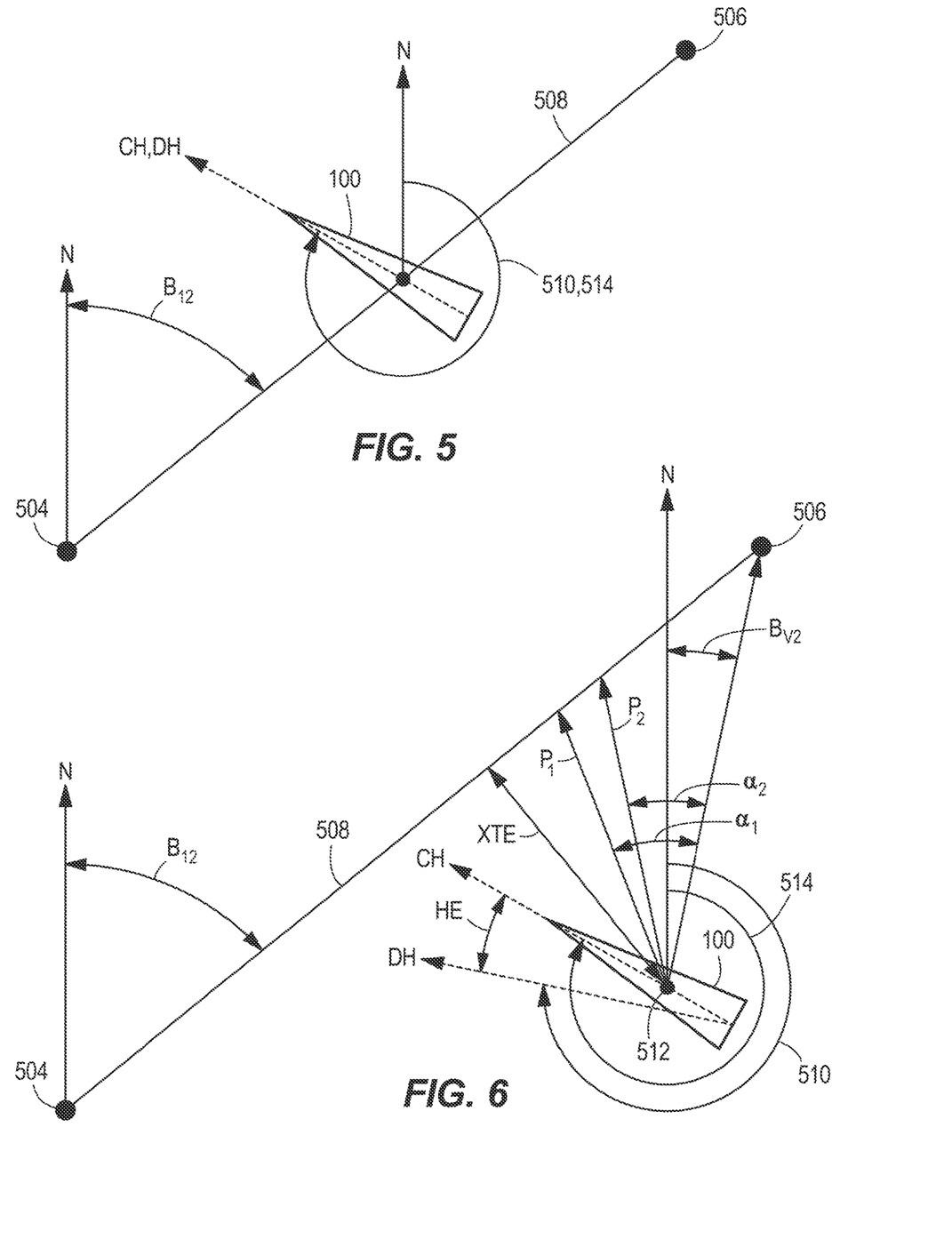
FIG. 5 illustrates a marine vessel that is on a track between two waypoints.
FIG. 6 illustrates a marine vessel that has been forced off a track between two waypoints.
Figure 7:
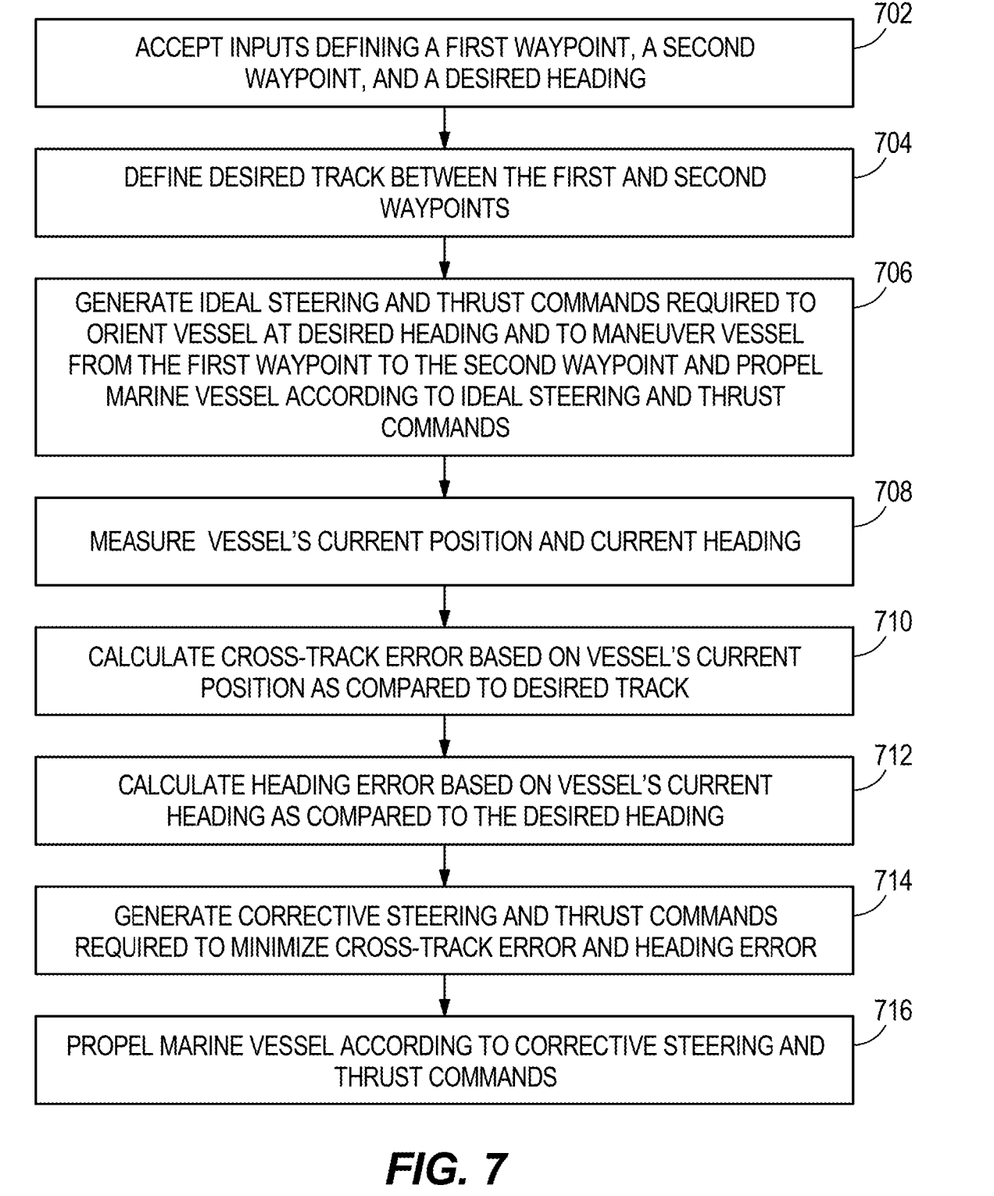
FIG. 7 illustrates one example of a method for maneuvering a marine vessel according to the present disclosure.

As shown at 704, the method next includes defining a desired track 508 between the first and second waypoints 504 and 506. The desired track 508 can be defined by either the electronic navigation device 104 or the control module 126 after the waypoints 504, 506 are defined, or the desired track 508 can be predefined and stored as route information in the electronic navigation device 104. After the waypoints 504, 506 and the desired track 508 are defined, the method includes generating ideal steering and thrust commands that are required to orient the vessel 100 at the desired heading 510 and to maneuver the vessel 100 along the desired track 508, as shown at 706. The propulsion system 108 thereafter propels the vessel 100 according to the ideal steering and thrust commands. This process is performed by the control module 126 according to the joystick-like thrust-vectoring algorithms described herein above. Such ideal steering and thrust commands, in the absence of external forces, will cause the vessel 100 to appear to drift from one waypoint to the next, as the vessel 100 will be propelled at a prescribed heading to the second waypoint 506.

While the vessel 100 is underway, the method includes measuring a current position 512 and a current heading 514 (angle between arrows representing due north N and current heading CH) of the vessel 100, as shown at 708. This may be done with the help of a position determination device, such as GPS receiver 136, which determines a current position 512 of the vessel 100, and a heading detector, such as IMU 138, which determines a current heading 514 of the vessel 100. Because the vessel 100 can be blown or forced off the desired track 508 or to a different orientation, there may be cross-track error or heading error while the vessel 100 is underway. The method therefore also includes calculating a cross-track error XTE based on the current position 512 of the vessel 100 as compared to the desired track 508, as shown at 710, and calculating a heading error HE based on the current heading 514 of the vessel 100 as compared to the desired heading 510, as shown at 712. Either of both of these calculations may be done by the electronic navigation device 104 or the control module 126, which calculates the cross-track error XTE as a distance perpendicular to the desired track 508 and the heading error HE as an angle between the desired and current headings.

As shown at 714, the method next includes generating corrective steering and thrust commands that are required to minimize the cross-track error XTE and the heading error HE. This will generally be done by the control module 126, using a feedback controller that minimizes the heading error and the position error, as described herein above with respect to feedback controller 17 of FIG. 1. For example, FIG. 6 shows an instance in which the vessel 100 will need to be rotated (yawed) counterclockwise to obtain the desired heading 510 and moved to the northwest to get back on the desired track 508. The control module 126 resolves these required marine vessel movements into a target moment and a target linear thrust. As shown at 716, the control module 126 then sends commands to the propulsion system 108, and the propulsion system 108 propels the marine vessel 100 according to the corrective steering and thrust commands, as appropriate, so as to maintain the vessel 100 on the desired track 508 at the desired heading 510.

The control module 126 generates the corrective steering and thrust commands that are required to minimize the cross-track error XTE and the heading error HE by calculating an absolute bearing $B_{V2}$ between the vessel's current position 512 and the second waypoint 506. If the vessel 100 were to be propelled along this bearing $B_{V2}$, the vessel 100 would move directly toward the second waypoint 506. However, the operator has previously expressed a desire to navigate along the desired track 508, so the control module 126 instead causes the vessel 100 to move back to the desired track 508 before or while proceeding to the second waypoint 506. The control module 126 achieves this type of corrective action by biasing or offsetting the calculated bearing $B_{V2}$ toward the desired track 508 (here, counterclockwise) so as to determine a path along which the vessel 100 can be propelled back to the desired track 508.

In a first example shown in FIG. 5, the vessel 100 is on the desired track 508 and has zero cross-track error. This results in the control module 126 generating a control action along a path pointed directly towards the desired second waypoint 506, along the desired track 508. In other words, there is no need to offset the control action direction because there is zero cross-track error. The vessel's current heading will be controlled to remain at the desired heading 510 as the vessel 100 traverses the desired track 508.

In a second example shown in FIG. 6, the vessel 100 is off the desired track 508 with a non-zero cross-track error XTE. Without an offset added to the output command, the direction of the corrective control action would point directly from the vessel's current position at 512 to the desired second waypoint 506 and would cause the vessel 100 to travel towards the second waypoint 506, but not on the desired track 508. With the biasing algorithm of the present disclosure, the direction of the corrective control action will instead generally point toward the second waypoint 506, but it will be offset in angle so as to cause the vessel 100 to head back towards the desired track 508 and potentially to reach the desired track 508 before reaching the desired second waypoint 506. The control module 126 determines the corrective steering and thrust commands at least in part by offsetting the absolute bearing $B_{V2}$ between the vessel's current position 512 and the second waypoint 506 toward the desired track 508 so as to determine a path along which the vessel 100 can be propelled back to the desired track 508. Note that the current heading 514 of the vessel 100 in FIG. 6 is also not the same as the desired heading 510. The corrective steering and thrust commands will therefore also cause the vessel 100 to rotate counterclockwise to achieve the desired heading 510. This could be done before propelling the vessel 100 along the path of the corrective control action, while the vessel 100 is being propelled along the path of the corrective control action, or after the vessel 100 is back on the desired track 508. Note that the vessel 100 need not be yawed so that it is propelled toward the desired track 508 in a fore direction, but rather could be propelled backwards or sideways, depending on the vessel's current location with respect to the desired track 508.

The amount of bias, which affects the location at which the vessel 100 intersects the desired track 508 before continuing to the second waypoint 506, could be a function of vessel speed or of cross-track error. In FIG. 6, for example, path $P_1$ is more offset in angle from the vector between 512 and 506 defining absolute bearing $B_{V2}$ than is path $P_2$. This is also shown in that offset angle $\alpha_1$ (defined between path $P_1$ and the vector defining absolute bearing $B_{V2}$) is greater than $\alpha_2$ (defined between path $P_2$ and the vector defining absolute bearing $B_{V2}$). Note that a multitude of other corrective paths exist, including those directly along the XTE line or directly along the vector indicating the bearing to the second waypoint 506; however, only two corrective paths are shown here for purposes of simplicity. The control module 126 could determine an angle by which to offset the absolute bearing $B_{V2}$ between the current position 512 and the second waypoint 506 as a function of a speed of the vessel or as a function of the cross-track error XTE. It may be desirable to use a corrective path that is less offset from the absolute bearing $B_{V2}$ when the vessel speed is relatively higher, and to use a corrective path that is more offset from the absolute bearing $B_{V2}$ when the vessel speed is relatively lower. This way, a fast-moving vessel 100 can intersect the desired track 508 at a smoother angle, which exerts less force on the vessel's occupants. It may also or instead be desirable to use a corrective path that is less offset from the absolute bearing $B_{V2}$ when the XTE is relatively lower, and to use a corrective path that is more offset from the absolute bearing $B_{V2}$ when the XTE is relatively higher. This way, a vessel 100 that is further from the desired track 508 can be brought back to the desired track 508 more quickly than if the corrective path were pointed more toward the second waypoint 506, resulting in the vessel 100 being on-track for a longer portion of the remaining journey. Note that if the offset angle was measured in a clockwise direction, instead of counter-clockwise as shown and described with respect to FIG. 6, the above logic would switch, because $P_1$ would be less offset in angle from the vector defining $B_{V2}$ than would $P_2$.

In some examples, the control module 126 uses one or both of current vessel speed and current cross-track error XTE to determine an angle (e.g., $\alpha_2$ for $P_2$ or $\alpha_1$ for $P_1$) by which to offset the absolute bearing $B_{V2}$ between the current position 512 and the second waypoint 506. An input-output map such as a lookup table saved in the memory of the control module 126 can be used for such determinations. The input-output map can output an angular value by which to offset the bearing $B_{V2}$, or can output a percentage value by which to multiply the bearing $B_{V2}$. Examples of the input-output map thus include a map that accepts a single input of vessel speed and outputs an angular value or a percentage value, a map that accepts a single input of a cross-track error and outputs an angular value or a percentage value, or a map that accepts dual inputs on separate axes of vessel speed and cross-track error and outputs an angular value or a percentage value. Note that the originally-calculated corrective path may be maintained until the vessel 100 is back on track, or the control module 126 may undertake another iteration of the method and re-calculate the corrective path based on a new XTE and/or vessel speed at predetermined time intervals. In still another example, the input device 112 is configured to allow for operator selection of a factor (e.g., an angle or percentage) by which to offset the absolute bearing $B_{V2}$ between the current position 512 and the second waypoint 506 for purposes of calculating the direction of the path. This allows the operator to choose whether the corrective control action is pointed more toward the second waypoint 506 or more toward the desired track 508.

Referring back to FIG. 2, in order to choose the waypoints 504 and 506 that define the desired track 508, the operator can, for example, choose an existing route saved in the memory of the electronic navigation device 104 or can download a pair or a list of waypoints corresponding to a desired route from the internet or an external drive or disk, which route can be overlaid on a navigational map 340 and displayed on the display screen 110. Alternatively, the operator can draw a desired route on the navigational map 340 shown on the display screen 110, for example via user input device 112 such as a touch screen interface activated by the operator's finger and/or a stylus or such as a mouse that controls a cursor on the display screen 110. The operator could also manually enter one, two, three, or more waypoints using a mouse and cursor, a stylus, or a finger and the display screen 110. If the operator selects or creates only one waypoint, the electronic navigation device 104 is programmed to set the current position of the vessel 100 as the first waypoint 504. The selected or created waypoint will then be set as the second waypoint 506. Although the electronic navigation device 104 defaults to setting the current position of the vessel 100 as the first waypoint 504, the input device 112 is configured to accept an input for the first waypoint 504 that is not the current position of the vessel 100. In this instance, the control module 126 would generate steering and thrust commands to propel the vessel 100 to the first waypoint 504 prior to propelling the vessel 100 to the second waypoint 506. The control module 126 may be programmed to first determine that the vessel 100 is within a threshold distance of the first waypoint 504 before propelling the vessel to the first waypoint 504, so that the vessel 100 is not automatically traversing waters the operator cannot currently see and which may therefore have obstacles.

The operator can choose to navigate the desired track 508 in any direction or orientation with respect to the desired track 508, including in a left-right/port-starboard direction. The operator can specify the desired heading 510 to be associated with the desired track 508 via the user input device 112, such as via a keyboard, mouse, or buttons that allow the operator to select the track or a portion of the track, either from the map 340 or from a list of waypoints presented on the display screen 110, and to assign a heading to that track or portion of the track. Alternatively, the operator could select a given track using a stylus or finger, and then swipe across the interactive display screen 110 in the direction of the desired heading 510. According to the present method, the control module 126 may accept an input to change the desired heading 510 while propelling the vessel along the desired track 508 from the first waypoint 504 to the second waypoint 506.

As noted, the input device 112 allows the operator to select to maneuver the vessel 100 back and forth along the desired track 508 between the first and second waypoints 504 and 506 at the desired heading 510. Alternatively, the operator may select a different desired heading when travelling from waypoint 504 to waypoint 506 than when traveling from waypoint 506 to waypoint 504. Any corrective action the vessel 100 needs to take will be determined as described herein above, although it should be understood that the status of the waypoints 504, 506 as being the first and second waypoints switches as the vessel 100 travels from waypoint 506 to waypoint 504. In other words, upon the return trip, the path of the corrective control action may be offset from the absolute bearing between the vessel's current position and the waypoint 504.

The input device 112 may also allow the operator to input an additional waypoint, and the control module 126 may then maneuver the vessel 100 continuously along the desired track 300 between the first waypoint 504, the second waypoint 506, and the additional waypoint at the desired heading. Referring to FIG. 3, the operator may choose to go from waypoint 301 to waypoint 302 to waypoint 303, and then back from waypoint 303 to waypoint 302 to waypoint 301. Alternatively, the operator may choose to go in a triangle from waypoint 301 to waypoint 302 to waypoint 303, and then directly to waypoint 301 again. The operator may also select a different desired heading for going between waypoints 301 and 302 than for going between waypoints 302 and 303, and so on.

Note that in the above description and figures, the position of the vessel 100 is shown as being measured at a point that is not at the center of the vessel 100. This is for purposes of clarity of the drawings, and is only exemplary. It may be desirable to have the position of the vessel 100 be measured at the location of the position determination device (GPS receiver 136) for easier calculations. Note also that the heading and absolute bearing of the vessel 100 are calculated with respect to a vector representing North, which may be true north or magnetic north, and is adjusted accordingly during later manipulations of the data, if necessary. The absolute bearing or heading may be determined with respect to an imaginary centerline of the vessel 100, running from bow to stern, although this is not shown in the present drawings for purposes of clarity thereof.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for maneuvering a marine vessel powered by a propulsion system, the method comprising:
accepting inputs to a control module, the inputs defining a first waypoint, a second waypoint, and a user-defined desired heading, wherein the user-defined desired heading is not equal to an absolute bearing between the first and second waypoints and is independent of the absolute bearing between the first and second waypoints;
defining a desired track between the first and second waypoints;
commanding the propulsion system to orient the vessel at the user-defined desired heading and to maneuver the vessel along the desired track while the vessel remains oriented at the user-defined desired heading;
measuring a current position and a current heading of the vessel;
calculating a cross-track error based on the vessel's current position as compared to the desired track;
calculating a heading error based on the vessel's current heading as compared to the user-defined desired heading; and
commanding the propulsion system to minimize the cross-track error by propelling the vessel along a path of corrective control action toward the desired track and to minimize the heading error by causing the vessel to yaw toward the user-defined desired heading;
wherein the user-defined desired heading is also independent of the path of corrective control action.

2. The method of claim 1, wherein the user-defined desired heading is independent of external conditions acting on the vessel.

3. The method of claim 2, further comprising accepting an input to change the user-defined desired heading while propelling the vessel along the desired track.

4. The method of claim 2, further comprising setting the vessel's current position as the first waypoint.

5. The method of claim 1, wherein propelling the vessel along the path of corrective control action toward the desired track comprises:
calculating an absolute bearing between the vessel's current position and the second waypoint;
offsetting the absolute bearing between the vessel's current position and the second waypoint toward the desired track so as to determine the path of corrective control action toward the desired track.

6. The method of claim 5, further comprising determining an angle by which to offset the absolute hearing between the vessel's current position and the second waypoint as a function of a speed of the vessel.

7. The method of claim 5, further comprising determining an angle by which to offset the absolute bearing between the vessel's current position and the second waypoint as a function of the cross-track error.

8. The method of claim 1, further comprising maneuvering the vessel back and forth along the desired track between the first and second waypoints while the vessel remains oriented at the user-defined desired heading.

9. The method of claim 1, further comprising:
accepting an input defining an additional waypoint;
defining the desired track between the first, second, and additional waypoints; and
maneuvering the vessel continuously along the desired track between the first waypoint, the second waypoint, and the additional waypoint while the vessel remains oriented at the user-defined desired heading.

10. A navigational system for a marine vessel, the navigational system comprising:
an electronic navigation device that defines a desired track including first and second waypoints and a user-defined desired heading, wherein the user-defined desired heading is not equal to an absolute bearing between the first and second waypoints and is independent of the absolute bearing between the first and second waypoints;
a vessel propulsion system;
a control module in signal communication with the electronic navigation device that commands the vessel propulsion system to orient the vessel at the user-defined desired heading and to maneuver the vessel along the desired track while the vessel remains oriented at the user-defined desired heading;
a position determination device that provides a current position of the vessel to the electronic navigation device, which calculates a cross-track error based on the vessel's current position as compared to the desired track; and
a heading detector that provides a current heading of the vessel to the control module;
wherein the control module receives the cross-track error from the electronic navigation device, calculates a heading error based on the vessel's current heading as compared to the user-defined desired heading, and commands the vessel propulsion system to minimize the cross-track error by propelling the vessel along a path of corrective control action toward the desired track and to minimize the heading error by causing the vessel to yaw toward the user-defined desired heading;
wherein the user-defined desired heading is also independent of the path of corrective control action.

11. The system of claim 10, wherein the user-defined desired heading is independent of external conditions acting on the vessel.

12. The system of claim 11, further comprising an input device for inputting the user-defined desired heading to the electronic navigation device.

13. The system of claim 12, wherein the input device is configured to accept a command to change the user-defined desired heading while the vessel is being propelled along the desired track.

14. The system of claim 12, wherein the electronic navigation device defaults to setting the vessel's current position as the first waypoint, and wherein the input device is configured to accept an input for the first waypoint that is not the vessel's current position.

15. The system of claim 10, wherein the control module determines the path of corrective control action at least in part by offsetting an absolute bearing between the vessel's current position and the second waypoint toward the desired track so as to determine the path of corrective control action toward the desired track.

16. The system of claim 15, further comprising an input device configured to allow for operator selection of a factor by which to offset the absolute bearing between the vessel's current position and the second waypoint.

17. The system of claim 15, wherein the control module determines an angle by which to offset the absolute hearing between the vessel's current position and the second waypoint as a function of a speed of the vessel or as a function of the cross-track error.

18. The system of claim 10, further comprising an input device that allows an operator to select to maneuver the vessel back and forth along the desired track between the first and second waypoints while the vessel remains oriented at the user-defined desired heading.

19. The system of claim 10, further comprising an input device that allows an operator to input an additional waypoint, wherein the vessel propulsion system thereafter maneuvers the vessel continuously between the first waypoint, the second waypoint, and the additional waypoint while the vessel remains oriented at the user-defined desired heading.

* * * * *